United States Patent
Danson et al.

(10) Patent No.: US 10,915,824 B2
(45) Date of Patent: Feb. 9, 2021

(54) TREND BASIS AND BEHAVIORAL ANALYTICS SYSTEM AND METHODS

(71) Applicant: Mattersight Corporation, Chicago, IL (US)

(72) Inventors: Christopher Danson, Austin, TX (US); Douglas Brown, Austin, TX (US); Roger Warford, Hoschton, GA (US); Andrew Traba, Chicago, IL (US); Jordana Heller, Chicago, IL (US)

(73) Assignee: MATTERSIGHT CORPORATION, Chicago, IL (US)

(*) Notice: Subject to any disclaimer, the term of this patent is extended or adjusted under 35 U.S.C. 154(b) by 839 days.

(21) Appl. No.: 15/686,452

(22) Filed: Aug. 25, 2017

(65) Prior Publication Data

US 2018/0032886 A1    Feb. 1, 2018

Related U.S. Application Data

(63) Continuation of application No. 15/071,037, filed on Mar. 15, 2016, now Pat. No. 9,760,838.

(51) Int. Cl.
*G06N 5/04* (2006.01)
*G06N 20/00* (2019.01)
*G06F 40/279* (2020.01)

(52) U.S. Cl.
CPC ............ *G06N 5/04* (2013.01); *G06F 40/279* (2020.01); *G06N 5/045* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,184,540 B2 | 2/2007 | Dezonno et al. |
| 8,041,592 B2 | 10/2011 | Lopez |
| 8,243,116 B2 | 8/2012 | Qvarfordt et al. |
| 8,558,685 B2 | 10/2013 | Long et al. |
| 8,583,434 B2 | 11/2013 | Gallino |
| 9,002,892 B2 | 4/2015 | Benyamin et al. |
| 9,042,530 B2 | 5/2015 | Cooper |
| 9,083,801 B2 | 7/2015 | Conway et al. |
| 2010/0153107 A1 | 6/2010 | Kawai |
| 2011/0044447 A1 | 2/2011 | Morris et al. |

(Continued)

OTHER PUBLICATIONS

Adam, N., et al., "Social media alert and response to threats to citizens (SMART-C)", 8th Intl Conf. on Collaborative Computing: Networking, Applications, and Worksharing, 2012, Oct. 14-17, 2012. (Year: 2012).*

(Continued)

*Primary Examiner* — Vincent Gonzales
(74) *Attorney, Agent, or Firm* — Haynes and Boone, LLP

(57) ABSTRACT

Methods, apparatus, and systems for analyzing data trends are described herein. The present disclosure includes the identification of trending terms in data through the use of an unsupervised algorithm. Trending terms are identified and counted during a first and second time period without reference to a library of pre-defined terms, along with at least one reason for using such trending terms. The set of trending terms and the at least one reason for use of the trending terms are displayed to a user.

26 Claims, 5 Drawing Sheets

(56) References Cited

U.S. PATENT DOCUMENTS

2012/0254333 A1    10/2012   Chandramouli et al.

OTHER PUBLICATIONS

Ritter, A., et al., "Open domain event extraction from Twitter", ACM KDD'12, Aug. 12-16, 2012, pp. 1104-1112. (Year: 2012).*
U.S. Appl. No. 15/071,037, filed Mar. 15, 2016, Danson et al.
Lau, Jey Han et al., "On-line Trend Analysis with Topic Models: #twitter trends detection topic model online," COLING 2012, Mumbai, Dec. 2012, pp. 1519-1534.
Schwartz, H. Andrew, et al., "Personality, Gender, and Age in the Language of Social Media: The Open-Vocabulary Approach," PLOS ONE 8(9): e73791, Sep. 25, 2013, 17 pages.
"Telephone Analysis," ACISS Systems, Inc., 2015, 2 pages.
Sentinel Visualizer, "Telephone Call Data Records Analysis Software," FMS, Inc., 2001-2016, 2 pages.
Mathioudakis et al., "TwitterMonitor: Trend Detection over the Twitter Stream", ACM SIGMOD 10, pp. 1155-1157.

* cited by examiner

TREND BASIS AND BEHAVIORAL ANALYTICS SYSTEM AND METHODS

CROSS-REFERENCE TO RELATED APPLICATIONS

This application is a continuation of U.S. patent application Ser. No. 15/071,037, filed Mar. 15, 2016, now allowed, the entire contents of each of which is hereby incorporated herein its entirety by express reference thereto

TECHNICAL FIELD

The present disclosure generally relates to methods, apparatus, and systems that identify relationships between data and providing this to a user, and more specifically identify trending terms in data through the use of an unsupervised algorithm.

BACKGROUND OF THE DISCLOSURE

The increasing availability of large scale data streams in recent years has led to efforts to track emerging topics. Emerging topics directed to politics, sports, world events, celebrity news, and other themes can appear in a variety of data sources including news feeds and social media. These emerging topics are sometimes known as "trends," and current and popular emerging topics are said to be "trending." Often, studies on emerging topics are centered on how new trends emerge, the longevity of trends, and the types of topics likely to trend.

Current efforts to track emerging topics generally include keyword-based searches. In this case, a search for emerging topics is conducted across data sources using known keywords. Generally, the occurrence of a keyword that is known to be associated with a topic is tallied across the various data sources, giving the researcher a general level of interest in the topic. These lists are generally compiled through the use of "supervised" algorithms that make inferences based on previously-identified keywords. However, keyword-based searches require the searcher to know the keywords and topics they are looking for, as well as requiring keywords to be linked to a specific topic. In particular, this type of search is not useful for newly created words or terms. Moreover, current efforts to track emerging topics are generally ineffective at identifying short-lived or newly emerging topics, and may not be able to track the evolution of topics over time.

Accordingly, improved methods and systems are needed and are disclosed herein that effectively identify trends and relationships between words in data.

SUMMARY

The present disclosure describes methods and systems of analyzing trends in data relationships. In a first aspect, the present disclosure encompasses a system for analyzing data relating to trends, which includes a processor, an analysis module, wherein the analysis module is a non-transitory computer readable medium operably connected to the processor, wherein the non-transitory computer readable medium comprises a plurality of instructions stored in association therewith that are accessible to, and executable by, the processor, wherein the plurality of instructions when executed: analyze a first plurality of communications occurring over a first time period; determine a first plurality of terms based on the analyzed first plurality of communications; analyze a second plurality of communications occurring over a second time period; determine a second plurality of terms based on the analyzed second plurality of communications; identify trending terms based on the determined first plurality of terms and the determined second plurality of terms; review the identified trending terms to determine at least one reason for use of the identified trending terms in the first time period, the second time period, or both; and communicate the identified trending terms and the at least one reason for use of the identified trending terms to a user, a display device configured to display the identified trending terms and the at least one reason for use of the identified trending terms to the user, and a routing engine configured to send an automated message to an external source based on the at least one reason for use of the identified trending terms.

In a second aspect, the present disclosure encompasses a method of analyzing data related to trends, which includes recording, by one or more processors, a first plurality of communications occurring over a first time period, determining a first plurality of terms based on the first plurality of communications, recording, by one or more processors, a second plurality of communications occurring over a second time period, determining a second plurality of terms based on the second plurality of communications, determining a frequency of the terms in each of the first and second time periods, identifying trending terms based on the most frequent terms used in the first and second time periods, determining at least one reason for use of the identified trending terms, formulating at least one topic from the identified trending terms, and displaying the identified trending terms, the at least one reason for use of the identified trending terms, and the at least one topic, to a user.

In a third aspect, the present disclosure encompasses a non-transitory computer readable medium including a plurality of instructions stored therein, wherein the plurality of instructions when executed: analyze a first plurality of communications occurring over a first time period and determine a first plurality of terms, analyze a second plurality of communications occurring over a second time period and determine a second plurality of terms, determine a frequency of the terms in each of the first and second time periods, compare the frequency of each of the terms in the first and second time periods, establish a frequency threshold, identify trending terms, wherein the trending terms are terms present in both the first and second time periods that exceed the frequency threshold, determine at least one reason for use of the identified trending terms, communicate the identified trending terms and the at least one reason for use of the identified trending terms to a user via a display device configured to display the identified trending terms and the at least one reason for use of the identified trending terms, and instruct a routing engine to send an automated message to an external source.

In a fourth aspect, the present disclosure encompasses a system for analyzing data relating to trends, which includes a processor, an analysis module, wherein the analysis module is a non-transitory computer readable medium operably connected to the processor, wherein the non-transitory computer readable medium comprises a plurality of instructions stored in association therewith that are accessible to, and executable by, the processor, wherein the plurality of instructions when executed: analyze a first plurality of communications occurring over a first time period, determine a first plurality of terms based on the analyzed first plurality of communications, analyze a second plurality of communications occurring over a second time period, determine a second plurality of terms based on the analyzed second plurality of communications, identify a trending topic based on frequency of terms used in both the first and second time periods, determine at least one reason why the identified trending topic is trending, communicate the identified trending topic and the at least one reason why the identified trending topic is trending to a user, a display device configured to display the identified trending topic and the at least one reason why the identified trending topic is trending, and a routing engine configured to receive instructions from the analysis module and send an advisory or warning to an external source.

Furthermore, the present disclosure describes methods and systems that analyze data relationships. The disclosure relates to a system for analyzing data relating to trends that includes a processor; an analysis module, wherein the analysis module is a non-transitory computer readable medium operably connected to the processor, wherein the non-transitory computer readable medium includes a plurality of instructions stored in association therewith that are accessible to, and executable by, the processor, wherein the plurality of instructions when executed: analyze a first plurality of communications occurring over a first time period based on voice data and non-voice data; determine a first plurality of terms based on the analyzed first plurality of communications; analyze a second plurality of communications occurring over a second time period based on voice data and non-voice data; determine a second plurality of terms based on the analyzed second plurality of communications; compare the terms of the first plurality of terms and the second plurality of terms based on one or more factors including a frequency of the terms in each of the first and second time periods; identify a set of trending terms based on the comparison of the terms without reference to a library of pre-defined terms; and communicate the identified set of trending terms to be displayed to a user; and a display device configured to display the identified set of trending terms to a user.

In one embodiment, the first time period and the second time period have fixed lengths that are equal. In another embodiment, the first time period and the second time period are sequential and do not overlap. In another embodiment, communicating the set of trending terms further includes instructions that, when executed, transmit the set of trending terms to a communication distributor. In a further embodiment, the instruction to identify the set of trending terms further includes establishing a frequency threshold, and including terms that exceed the frequency threshold in the identified set of trending terms. In yet another embodiment, the one or more factors further includes a co-occurrence of two or more terms. In a preferred embodiment, the system further includes instructions, that when executed, identify a set of trending terms that includes one or more sets based on the frequency of co-occurring terms from the comparison of terms.

In one embodiment, the terms of the first plurality of terms and the second plurality of terms each independently include one or more words, ideograms, hashtags, numbers, single letters, abbreviations, or written symbols. In another embodiment, each term of the identified set of trending terms includes one or more words. In a preferred embodiment, each term of the identified set of trending terms includes between one and ten words. In yet another embodiment, the analysis module further includes a memory, the analysis module being configured to receive and store the first plurality of terms and the second plurality of terms in the memory, configured to compare the first plurality of terms to the second plurality of terms, configured to store the identified set of trending terms, or a combination thereof. In a further embodiment, the system further includes a routing engine configured to send an automated message to an external source based on the set of trending terms.

In a second aspect, the disclosure relates to a method for analyzing data related to trends, which includes: recording, by one or more processors, a first plurality of communications occurring over a first time period based on voice data and non-voice data; determining a first plurality of terms based on the first plurality of communications; recording, by one or more processors, a second plurality of communications occurring over a second time period based on voice data and non-voice data; determining a second plurality of terms based on the second plurality of communications; comparing the terms of the first plurality of terms and the second plurality of terms based on one or more factors including a frequency of the terms in each of the first and second time periods; identifying a set of trending terms based on the comparison of the terms without reference to a library of pre-defined terms, wherein the set of trending terms includes a set of most frequent terms; and displaying the identified set of trending terms to a user.

In one embodiment, the first time period and the second time period have fixed lengths that are equal. In a preferred embodiment, the first time period and the second time period are sequential and do not overlap. In another preferred embodiment, the method further includes instructions that, when executed, transmit the identified set of trending terms to a communication distributor. In yet a further preferred embodiment, the instruction to identify the set of trending terms further includes establishing a frequency threshold, and including terms that exceed the frequency threshold in the identified set of trending terms. In yet another embodiment, the one or more factors further includes a co-occurrence of two or more terms. In a more preferred embodiment, the method further includes instructions that, when executed, identify a set of trending terms that includes one or more sets based on the frequency of co-occurring terms from the comparison of terms. In another embodiment, the terms of the first plurality of terms and the second plurality of terms each independently include one or more words, ideograms, hashtags, numbers, single letters, abbreviations, or written symbols. In a further embodiment, each term of the identified set of trending terms includes one or more words. In yet another embodiment, each term of the identified set of trending terms includes between one and ten words.

In a third aspect, the disclosure relates to a system for analyzing trend data, which includes a processor; an analysis module, wherein the analysis module is a non-transitory computer readable medium operably connected to the processor, wherein the non-transitory computer readable medium includes a plurality of instructions stored in association therewith that are accessible to, and executable by, the processor, wherein the plurality of instructions when executed: analyze a first plurality of communications occurring over a first time period and determine a first plurality of terms; analyze a second plurality of communications occurring over a second time and determine a second plurality of terms; determine the frequency that each term of the first plurality of terms and the second plurality of terms respectively occurs during the first and second plurality of communications; compare the frequency of each of the terms in the first plurality of terms to the frequency of each of the terms in the second plurality of terms; identify one or more trend parameters; determine one or more trend factors based on application of the identified one or more trend parameters to the comparison of terms of the first plurality of terms to the terms of the second plurality of terms; and communicate the determined set of trend factors to a display; and a display device configured to display at least the determined set of trending terms to a user.

In one embodiment, the determined one or more trend factors further include an emergence of a trend, a length of a trend, the popularity of a trend, and the geographic spread of a trend. In a preferred embodiment, the popularity of a trend is based on the frequency of terms of the first and second plurality of terms that are related to the determined trend. In yet another embodiment, the first time period and the second time period have fixed lengths that are equal. In a preferred embodiment, the first time period and the second time period are sequential and do not overlap.

In another embodiment, the system further includes instructions that, when executed, transmit the set of determined trending terms to a communication distributor.

In a further embodiment, the one or more identified trend parameters further include a co-occurrence of two or more terms. In another embodiment, the terms of the first plurality of terms and the second plurality of terms each independently include one or more words, ideograms, hashtags, numbers, single letters, abbreviations, or written symbols. In yet a further embodiment, the analysis module further includes a memory, the analysis module being configured to receive and store the first plurality of terms and the second plurality of terms in the memory, configured to compare the first plurality of terms to the second plurality of terms, configured to store the determined trend factors, or a combination thereof.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

The present disclosure describes methods and systems that analyze data relationships and identify the emergence and prevalence of trending terms in data streams. The analysis of the data streams is conducted through the use of an unsupervised algorithm.

DETAILED DESCRIPTION

Figure 1:
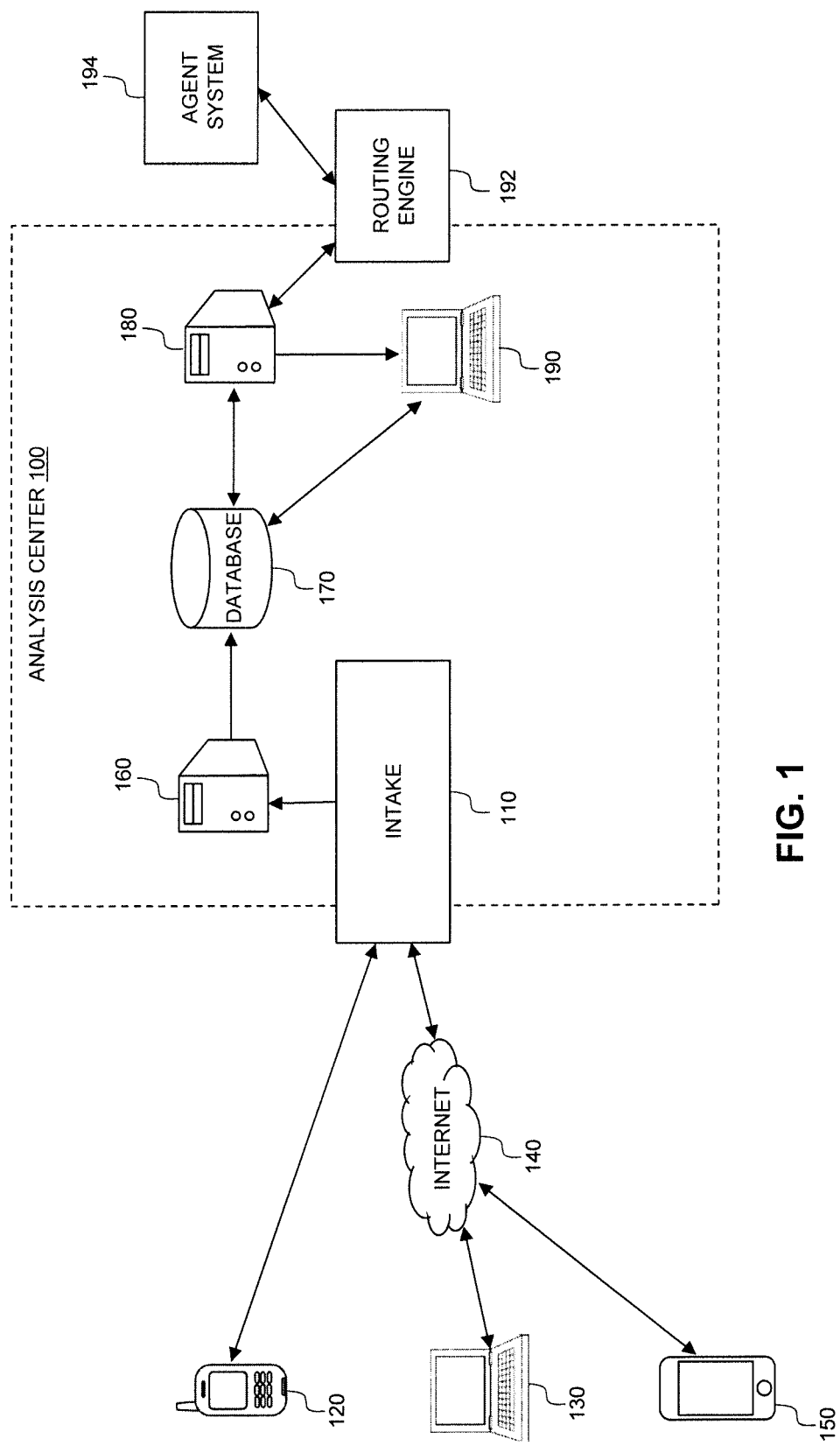
FIG. 1 is a block diagram of an embodiment of a system for analyzing trending topics according to various aspects of the present disclosure.

The present disclosure advantageously describes methods and systems that identify trends and relationships between terms in data streams, such as collected data or data provided by a customer. In particular, the present disclosure includes an unsupervised algorithm that in part identifies statistically significant changes in the frequency of use and co-occurrence of terms to identify trend information. Preferably, this algorithm and the processes herein identify this trend information without reference to a library or database of predefined terms, which can advantageously permit identification of new trends that might be identified using new or different terminology than a conventional topic or trend.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a simplified block diagram of an embodiment of an analysis center 100 according to various aspects of the present disclosure. An analysis center 100 as described herein can include any facility or system server suitable for receiving and recording electronic communications from data sources. Such data sources can include communications on the internet, communications from customers to one or more businesses, and communications between employees. Data sources can include telephone calls, video interactions, facsimile transmissions, e-mails, web interactions, texts, chats, and voice over IP ("VoIP"). These communications may occur on public switched telephone network (PSTN) or the Internet, e.g., including via Skype®, Facetime®, Tango™, or any other communication app, program, website, or other software or hardware. Various specific types of communications contemplated through one or more of these channels include, without limitation, email, SMS data (e.g., text), ideograms (such as emoticons or emojis), Unicode, voice-to-text translation, tweet, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, etc. It is contemplated that these data sources may be transmitted by and through any type of telecommunication device and over any medium suitable for carrying such data. For example, the data sources may be transmitted by or through telephone lines, cable, or wireless communications (e.g., satellite, Wi-Fi, Bluetooth, cellular phone network, etc.).

As shown in FIG. 1, the analysis center 100 of the present disclosure is adapted to receive and record varying electronic communications and data formats. In some embodiments, an intake 110 of the analysis center 100 collects data from numerous data sources. For example, the analysis center 100 may collect data from telephones and cellular (i.e. mobile) phones 120, fax machines, computers 130, or personal computing devices 150, as well as directly scraping information from one or more websites or other information on the Internet 140. Further, the analysis center 100 may accept internet-based interaction sessions from computers 130, VoIP telephones, and personal computing devices 150 such as internet-enabled smartphones and tablets, and personal digital assistants (PDAs). These data sources generally include voice and non-voice data.

As one of ordinary skill in the art would recognize, the communication channels associated with an analysis center 100 illustrated in FIG. 1 is just an example, and the analysis center 100 may accept other data from other sources, through various additional and/or different devices and communication channels whether or not expressly described herein. For example, in some embodiments, internet-based interactions, video-based interactions and/or telephone-based interactions may be routed through a customer service center, such as a call center or fulfillment center, before reaching the analysis center 100. It should be understood that such a customer service center can include stand-alone or third-party service centers or proprietary service centers (e.g., staffed with employees or consultants for a particular company, such as a computer vendor, airline, social media app, hotel chain, etc.). These interactions may also be routed simultaneously to the analysis center and the customer service center (or even directly and only to the analysis center, in some embodiments to be distributed to a customer service center after analysis according to the disclosure herein). In some instances, the customer service center captures interaction data relevant to the analysis center 100, and applies computer-implemented linguistic algorithms to the data to generate digital data for the analysis center 100. In other embodiments, the analysis center 100 applies such algorithms and generates digital data for analysis. Further, the customer service center may be a part of, or independent of, the analysis center 100.

Figure 2:
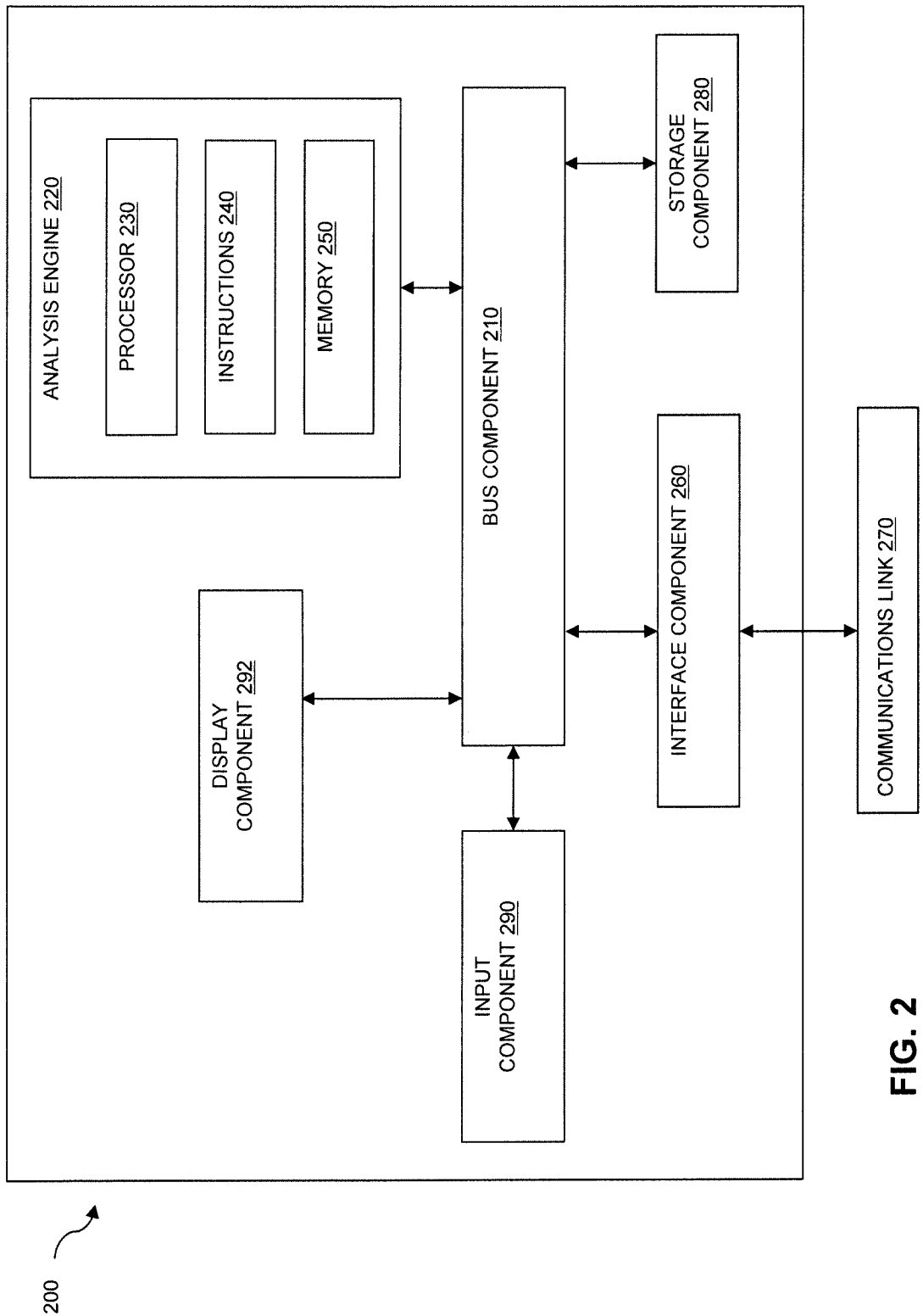
FIG. 2 is a detailed block diagram of the analysis system of FIG. 1 according to aspects of the present disclosure.

The analysis center 100 further includes a conversion module 160, a database 170, an analysis control system 180, and a display module 190. The conversion module 160 is designed to receive gathered or provided data streams from the intake 110. In some embodiments, the conversion module 160 is an information handling system such as a computer, server, workstation, mainframe computer, or other suitable computing device. The conversion module 160 can be a separate and distinct system, or alternatively, be an integrated component of an analysis control system 200 as shown in FIG. 2. The conversion module can convert linguistic information into a text file for further handling and analysis.

In some cases, the conversion module 160 is designed to convert data streams with analog data, such as audio or voice data, into a digital format. In some cases, the data streams are converted into binary or text-based forms. Ultimately, the data may be converted into a set of terms. Furthermore, the conversion of digital data to terms may occur at the conversion module 160, or alternatively, at the analysis control system 180. Terms may include words of different languages, numbers or numerals, hashtags, single letters, abbreviations, ideograms (such as emoticons or emojis), Unicode, voice-to-text translation, or other written symbols, or any combination thereof. A single term may include combinations of the above forms or combinations within a specific category, e.g., multiple numbers or words. In some cases, terms can be created by any number of compilation operations, including removal of stop words (words filtered out before or after processing of natural language data), stemming, augmentation, creation of a wordnet, and removal of parts of words. Furthermore, words that are found to be related may be combined into terms regardless of their frequency. The terms may be analyzed by the analysis control system 180 to provide data about emerging topics, as discussed further in conjunction with FIGS. 3-5. The digitized data, including terms, can be communicated by the conversion module 160 to the database 170, where it can be accessed by the analysis control system 180 and display module 190.

In some embodiments, the conversion module 160 transmits data to a database 170. The analysis control system 180 may access the database 170. The database 170 may also be accessed directly by a display module 190. The database 170 may be any type of reliable storage solution such as a RAID-based storage server, an array of hard disks, a storage area network of interconnected storage devices, an array of tape drives, or some other scalable storage solution located either within the contact center or remotely located (i.e., in the cloud). In the example of FIG. 1, the database is an independent module within the analysis center. However, in some embodiments, the database 170 is an integrated component of an analysis module such as the analysis control system 200 as shown in FIG. 2. The database 170 may be populated with data from within the analysis center 100 as well as data made available by external sources such as a third party database or a data analytics center.

The analysis control system 180 may be generally configured to provide recording, voice analysis, data storage, data relationship analysis, trend analysis, behavioral analysis, and other processing functionality to the analysis center 100. In the illustrated embodiment, the analysis control system 180 is an information handling system such as a computer, server, workstation, mainframe computer, or other suitable computing device. In other embodiments, the analysis control system 180 may be a plurality of communicatively coupled computing devices coordinated to provide the above functionality for the analysis center 100. As shown in FIG. 1, the analysis control system 180 is configured to perform analysis of data streams gathered by intake 110. This analysis includes performing software instructions on the data, applying algorithms to the data, or by sorting the data in other ways. The results of the data are preferably communicated to the display module 190, although it should be understood that the data may be stored first for display later, transmitted remotely for display, etc., or both. The display module 190 may include an interface such as a computer screen on which a user can view analysis results. The display may also be included as an integrated component of an analysis control system 200 as shown in FIG. 2.

The analysis control system 180 may also include a routing engine 192, which may be configured to communicate with the analysis control system 180 as well as an external agent system 194. This communication may be bi-directional between, or uni-directional from, the analysis control system 180 and routing engine 192. In some embodiments, the routing engine 192 receives instructions from the analysis control system 180 and sends communications to other devices or systems. The routing engine 192 may include wireless communication technology, such as a WiFi or Bluetooth module. Additionally, the routing engine 192 may be configured to communicate to external sources or departments via text message, phone messages, or internet communications.

In particular, the routing engine 192 may receive instructions from the analysis control system 180 to send a message, advisory, or warning based on received data. In some embodiments, the message, advisory, or warning is sent to an agent system 194 to alert agents who are trained and/or qualified to address the problem. In some embodiments, the agent system 194 includes communication systems to alert agents in various locations, such as security guards or first responders. The agent system 194 may also be configured to report back to the routing engine 192 on the status of the alert. For example, the analysis control system 180 may recognize the emergence of a trend involving the term "flood" and related terms such as "water" and "basement." At this point, the analysis control system 180 may send instructions to the routing engine 192 which sends an automatic advisory message to an agent system 194. The agent system 194 may route the automatic advisory message to a building manager or contact the building manager directly, for example, by a receptionist who calls the building manager after receiving the automatic advisory message. Alternatively, the routing engine 192 may send an automated message directly to the building manager without contacting the agent system 194. Once the building manager responds to the automated message, he or she may respond back to the agent system 194 and/or the routing engine 192 to report that the problem has been solved. The routing engine 192 may be configured to send other automated messages in response to received messages.

In some embodiments, the routing engine 192 sends communications directly to customers. For example, the routing engine 192 generates and sends one or more messages, such as a marketing email, to one or more customers where the messages include content based on the identified trending topic. The relevant customers can be selected by any suitable technique, such as pre-selected customers, customers relevant to the trending topic, customers with the least or most recent contact with the contact center, customers with the most recent purchase(s) or the highest value purchase(s) over a selected time frame, by a dynamically generated list of customers selected based on the trending topic, by customers in a selected geographic region (e.g., a city, a county, a state, or a distance from a selected point) based on their GPS location determined from a mobile device or app associated with that customer, by customers who reside in a selected geographic region, or the like, or any combination thereof. For example, the routing engine 192 may be configured to send automatic emails to a list of affected tenants or owners stating, "if you have been affected by a flood, please contact your agent John Smith and click here if you need support." As another example, customers of a hotel chain having problems with a new doorlock system or demagnetizing key cards can be alerted by a message such as "visit the front desk for a replacement or spare key before returning to your room." The routing engine 192 may also send one or more messages to one or more internal or external agents, such as travel agents who specialize in booking hotels or flights during an emergency, or to one or more agents who have experience handling a particular type of emergency. As discussed above, these agents may be contacted directly via the routing engine 192, or may be contacted through the agent system 194. In another embodiment, the routing engine 192 generates and sends one or more messages based on the trending topic to one or more internal agents, which one or more messages can include a proposed script for the agent to provide select customers information on addressing an issue raised by the trending topic, such as "Call the following list of customers to personally warn them of an incoming storm, and offer information on storm preparation to minimize damage and the need for insurance claims."

The routing engine 192 may also be configured to route automatically message(s) to one or more agents and one or more customers, each based on the trending topic. The routing engine 192 may also route tasks, such as messages, customer calls, customer contacts by social media, or the like, and is not limited to just routing messages to customers or agents.

The routing engine 192 may also be configured with other automatic updating capabilities relating to trend analysis. For example, the routing engine 192 may be connected to a commercial website and have website editing abilities. As trending topics are observed, the routing engine 192 may automatically increase the visibility of products on the website, such as displaying images on a main page, in larger font, earlier in a numbered or prioritized list of results, by highlighting certain products, or any combination thereof.

Furthermore, the routing engine 192 may be configured to send messages to a marketing or research and development department of a company. For example, the routing engine 192 may send a message to a department head in regards to products associated with trends identified by the analysis center 100 which may be further marketed or developed.

FIG. 2 shows a block diagram of an analysis control system 200 according to aspects of the present disclosure. In some embodiments, the analysis control system 200 can perform some or all of the functionality ascribed to the analysis center 100 shown in FIG. 1. For instance, the analysis control system 200 may record or receive telephone, internet, and/or other interactions or communications, perform data conversion and data analysis, perform other analysis center-related computing tasks, as well as combinations thereof. In particular, the analytics control system 200 may be integrated into the analysis control system 180 as a hardware or software module and share its computing resources, such as with one or more of intake 110, conversion module 160, database 170, and display module 190. Alternatively, the system 200 may be a separate computing system from the analysis control system 180.

The analysis control system 200 may conduct automated analysis on data streams. In particular, the analysis control system 200 can be configured to analyze sets of terms to identify emerging topics of interest. The analysis control system 200 can include a bus component 210, an analysis engine 220, a network interface component 260, a communications link 270, a storage component 280, an input component 290, and a display component 292. In some cases, the analysis engine 220 is responsible for analyzing data streams received by the analysis control system 200. The analysis engine 220 can include a processor 230 that is communicatively coupled to a memory 250, as well as a set of instructions 240.

In accordance with embodiments of the present disclosure, analysis engine 220 performs specific operations by processor 230 executing one or more sequences of one or more instructions 240 contained in memory 250. The processor 230 can be any custom made or commercially available processor, a central processing unit (CPU), an auxiliary processor among several processors associated with the analysis control system 200, a semiconductor-based microprocessor (in the form of a microchip or chip set), a macroprocessor, a collection of communicatively coupled processors, or any device for executing software instructions. The memory 250 provides the processor 230 with non-transitory, computer-readable storage to facilitate execution of computer instructions by the processor. Examples of memory 250 may include random access memory (RAM) devices such as dynamic RAM (DRAM), synchronous DRAM (SDRAM), solid state memory devices, and/or a variety of other memory devices known in the art.

Logic may be encoded in a computer readable medium, which may refer to any medium that participates in providing instructions 240 to processor 230 for execution. In one embodiment, the computer readable medium is non-transitory. Such a medium may take many forms, including but not limited to, non-volatile media, volatile media, and transmission media. In various implementations, volatile media includes dynamic memory, such as memory 250, and transmission media includes coaxial cables, copper wire, and fiber optics, including wires that include bus component 210. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

Furthermore, instructions 240 may be read into memory 250 from another computer readable medium, such as storage component 280. These may include instructions to compare terms gathered within a time period or during various time periods, organize terms by factors such as frequency and co-occurrence, track the changes in one or more of these factors over times, develop trend analysis, and display one or more trends and related results in various formats to a user. In other embodiments, hard-wired circuitry may be used in place of or in combination with software instructions for implementation of one or more embodiments of the disclosure.

Computer programs, instructions, and data may be stored on the storage component 280. The storage component 280 may include mass storage devices including hard discs, optical disks, magneto-optical discs, solid-state storage devices, tape drives, CD-ROM drives, and/or a variety of other mass storage devices known in the art. Further, the mass storage device may be implemented across one or more network-based storage systems, such as a storage area network (SAN).

Still referring to FIG. 2, the interface component 260 is operable to receive and transmit analysis center-related data between local and remote networked systems and communicate information via the communications link 270. In some embodiments, the interface component 260 is configured to have the communication abilities of the routing engine 192 of FIG. 1. Examples of interface components 260 may include Ethernet cards, 802.11 WiFi devices, cellular data radios, and/or other suitable devices known in the art. The analysis control system 200 may further include any number of additional components, which are omitted for simplicity, such as input and/or output (I/O) devices (or peripherals), buses, dedicated graphics controllers, storage controllers, buffers (caches), and drivers. Further, functionality described in association with the analysis control system 200 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software. In some embodiments, analysis data is routed from the analysis engine 220 to an external communications distributor via the interface component 260.

The display component 292 may be configured to transmit data in a graphical format, such as on a computer monitor or a portable computing device (e.g., a cellphone, a tablet device, etc.). In some cases, analysis data from the analysis engine 220 is available to be displayed in several formats, optionally even simultaneously on the display component. For example, the display may show a graph of changes in term frequency alongside a list of the most frequently found terms. Alternatively, the display component is an interface to an external display.

Figure 3:
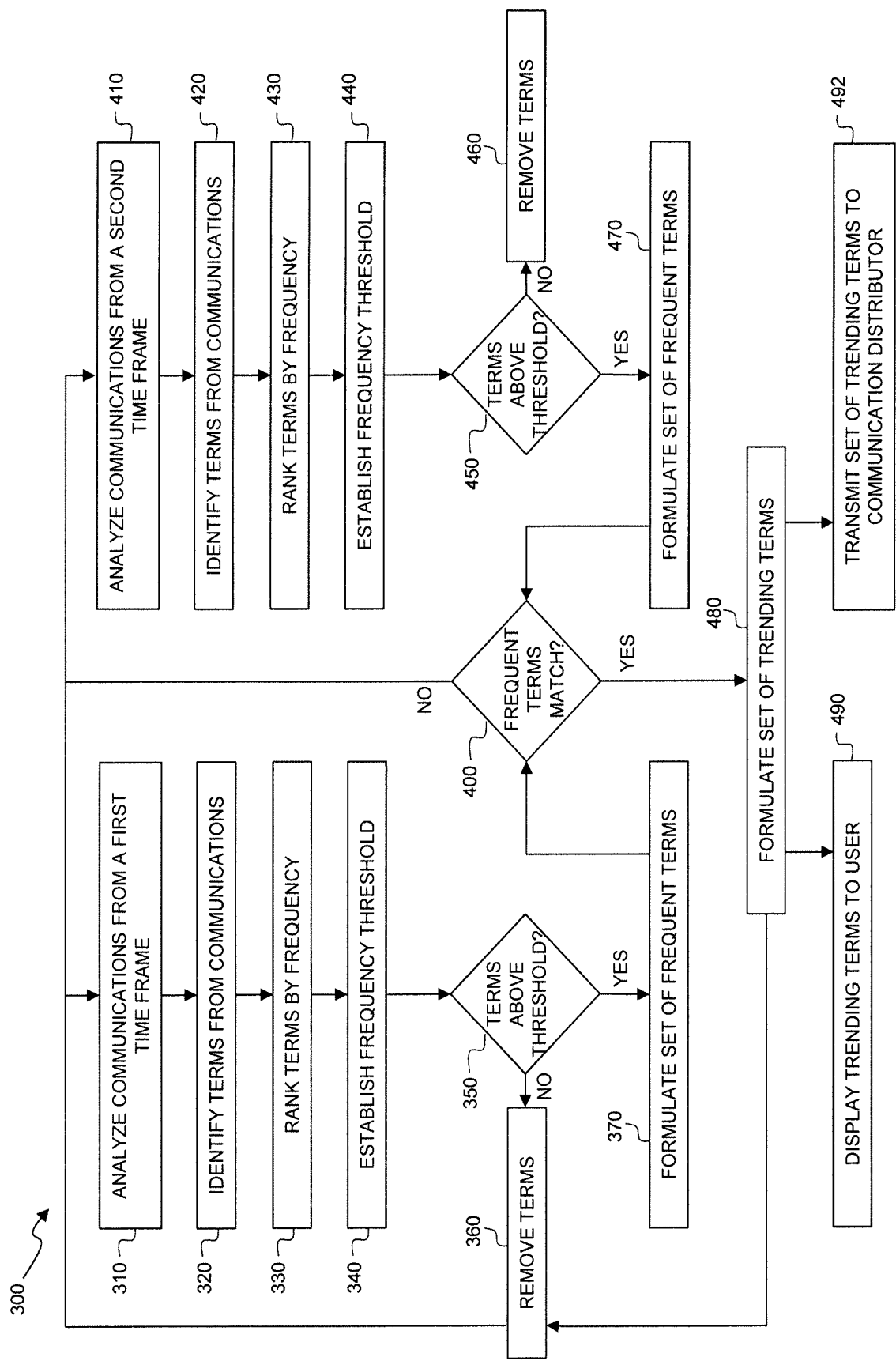
FIG. 3 is a flowchart illustrating a method of determining a set of trending terms according to aspects of the present disclosure.

An exemplary method 300 of analyzing data streams according to the disclosure is described with respect to FIG. 3. Method 300 may be performed by an analysis device like the analysis control system 200 of FIG. 2. At step 310, the analysis control system 200 analyzes communications from a first time frame. In various embodiments, the time frame is a fixed amount of time spanning a recent time frame. The communications analyzed during this step include data streams collected by the intake 110 of the analysis center 100. Alternatively, these communications can be received directly by an analysis engine 220. The data streams may contain both verbal and nonverbal communications, including electronic communications and telephonic communications. In particular, the data streams may contain discussion forum feeds and social media posts, such as Twitter feeds, that correspond to the first time frame. In some cases, social media posts created during the time frame are included in the communications of step 310.

It should be understood that the first time frame can be any length of time suitable to the trend or information desired to be evaluated. In some cases, the length of either the first time frame or second time frame may be 1-3 hours or 3-24 hours, while in other cases the time frame may be 1-7 days, 1-4 weeks or 1-3 months. An exemplary first time frame might be over the course of a few minutes, such as 1 to 60 minutes, such as after a public event to evaluate perceptions of the event, while another might be over the course of up to a few hours, such as 1 minute to 3 hours, to track persons being rescued from an emergency event. In yet another example, the first time frame might be over the course of several days, such as after a new product is released on the market or new locks are installed in a hotel to confirm there are no dangerous or problematic developments. Yet another example of a first time frame is over a frame of days to weeks, such as to track popularity of a song or an artist after release of an album, or to track patient compliance with a new drug or newly prescribed drug to a group of patients such as for a new indication. The systems and methods herein can also look at each new incoming communication and treat that as a second time frame to be compared to a prior communication or group of communications.

At step 320, the analysis control system 200 identifies terms based on the communications (including any interactions, as noted above). The terms may be identified from both verbal and nonverbal data. In the case of verbal data, the identification of terms may be accomplished through the use of a conversion module 160 as shown in FIG. 1.

At this step, the terms are not identified by reference or comparison to a library of known terms and the linguistic algorithm of this disclosure can be considered to be in a learning phase to determine what terms are relevant in the first place. Some current methods for identifying emerging topics rely on the comparison of received words to a library of known words to identify events. However, the emergence of events often involves a dynamic vocabulary where words are created or adapted in conjunction with events. For example, the term "webinar" was created in the late 1990s to describe seminars conducted over the interne. "Webinar," Merriam-Webster Dictionary (accessed Dec. 14, 2015). These newly created words are not recognized by the current methods as discussed above, and are difficult (if not impossible) for human agents to identify in short time frames or in real-time given the quantity of information being constantly generated and transmitted.

The present disclosure permits identification of new terms through the use of an unsupervised algorithm. A "supervised algorithm," as used herein, is based either on a predetermined keyword library (such as defining the topic "election" with words chosen a priori such as "president", "vice", "poll", and "race") or multiword groupings that are labeled with a set of predetermined topic labels. An "unsupervised algorithm" as used herein is defined as an algorithm that draws inferences from datasets without comparing terms to an existing library or labeling data for further use. The use of an unsupervised algorithm may provide advantages over conventional systems using a supervised algorithm. In particular, a supervised algorithm is only capable of drawing inferences on previously-defined terms, and typically requires regular input to define, classify, and associate new terms. This may create a delay in data analysis, including identifying trends. In contrast, the use of an unsupervised algorithm according to this disclosure may assist in identifying newly created terms or identifying newly identified terms, for example, the name of a newly discovered actor, a newly famous actor, or a previously obscure location where a major event has recently occurred (e.g., Fukushima, Japan). The unsupervised algorithm may also be useful for recognizing existing terms used in conjunction with a new event, such as the term "rad" in the 80s to connote something hip or cool (instead of that term's previous use in connection with a mathematical function). An unsupervised algorithm may also be used to identify unexpected events. For example, a user using an unsupervised algorithm may identify a topic with associated terms such as "rain", "Houston", "cancel", "weather", and "flood." The emergence of this topic may be used to identify public interest around a rain storm in Houston, even if the user was previously unaware of the rain storm.

Unsupervised algorithms may also be used to detect concepts based on unknown words, or even concepts that cannot be represented by a single word. For example, given a sufficient volume of discussion, an unsupervised algorithm can detect the concept "webinar" even if the word "webinar" cannot be accurately transcribed or has not yet been sufficiently defined and input to a supervised algorithm. It may be detected because communication channels are likely to include related words like "web", "broadcast", and "lecture". A sufficient amount of communications addressing the new topic will allow the detection of the concept, even without the specific word itself. Accordingly, even though a system with an unsupervised algorithm may be limited by transcription abilities for new words, the detection of multiword topics allows the system to continue detecting emerging novel topics.

Other methods of identifying previously unknown words are also contemplated by the present disclosure. In particular, words may be recognized by text analysis (which may be used to compare similar words) or by phonetic translation. A phonetic analysis of a previously unidentified word may include breaking the word down more easily identifiable parts. For example, the newly created word "voluntourist" (which describes tourists doing volunteer work in the communities that they visit) may be detected in a communication stream by the analysis control system 200. The analysis control system 200 may break the word down into parts such as "vol", "volun", "tour", "tourist", and "ist", for example. These parts may be matched with other words that include similar phonetic sounds, similar character or letter order, or similar order of parts, or any combination thereof. For example, the analysis control system 200 may recognize the combination of the word "tourist" with the partial word "volun" and categorize the word accordingly. Additionally, the analysis control system 200 may be configured to recognize a phonetic similarity between the partial word "voluntour" and the word "volunteer" and associate the words together on this basis.

Another aspect of the present disclosure that allows for the identification of new terms is that the analysis of terms for each time frame may be independent of the analysis for other time frames.

At step 330, the analysis control system 200 ranks terms by frequency. "Frequency," as used herein, refers to a comparison of the relative prevalence of terms. Although this may include a raw numerical comparison of terms within a given communication (i.e., 12 instances of the term "democrat" compared to 24 instances of the term "republican" within a single communication), "frequency" can also represent a comparison the prevalence of terms across the same time frame, a comparison of terms (or associated key words, like "donkey" or "elephant" with respect to the main U.S. political parties) across different time frames, a comparison of terms across different communication sources or channels, a comparison of terms across different clients, or a comparison of the overall percentage of terms in one or more communications. In essence, the frequency of terms is calculated to identify significant and unexpected changes in the occurrences of terms in a communications stream. In some embodiments, the system 200 creates a list of all terms identified in the data streams of the first time frame and tallies the number of occurrences of each term. In other embodiments, the system 200 creates separate lists of terms for each data stream. For example, the system 200 may count the number of times that the term "oscars" appears in each separate data source, such as in email, telephone discussions, and social media feeds. The calculation of frequency in individual data sources (e.g., in a particular social media app, or for a particular speaker or pair of communicants) may allow a user to track the prevalence of terms across various media sources. In some embodiments, the frequency of terms is calculated for one or more time slots within the first time frame, in which the time slots are portions of the time frame. In other embodiments, the frequency of terms is calculated for the entire first time frame. As discussed above, the first time frame itself can be adjusted depending on the potential terminology or trends, such that this analysis and calculation can be conducted iteratively over various first time frames. It may be that some topic and terminology appears to be a trend only if viewed over a 5-minute frame or over a 3-week frame.

At step 340, the analysis control system 200 may establish a frequency threshold for terms. In some cases, the total number of terms is used to determine the frequency threshold. For example, the threshold could be established by calculating an average frequency for terms across all data sources for the entire time frame. The threshold may also be calculated by a frequency percentile across the total number of terms. In this case, the most frequently-mentioned term identified during the time frame is said to be in the 100th percentile for frequency, and the least frequently-mentioned term is in the 0th percentile. In this example, the frequency threshold may be set at the 25th-50th percentile for term frequency, at the 50th-60th percentile, or at the 60th-75th percentile. In other cases, a specific number of occurrences for each term (such as five occurrences of the term) can be used to establish a frequency threshold. Furthermore, a separate frequency threshold can be established for each data stream individually. In any case, the inclusion of a frequency threshold in the various methods may allow for the simplification of the determination of frequent terms in step 370 and 470. Use of a frequency threshold may also be useful as a filter for use with high-volume data streams, such as social media feeds, as this can limit the quantity of data requiring analysis to determine a set of trending terms according to the disclosure.

At step 350, the analysis control system 200 determines whether terms are above or below the threshold set at step 340. Terms with a frequency at or below the threshold may be removed from the database 360, or simply ignored in conducting further analysis. Terms with a frequency above the threshold may be formulated together as a set of frequent terms in step 370, or may be used with one or more additional criteria (e.g., including two or more trending terms, excluding certain terminology, or requiring or excluding words in certain languages or looking for the same term across a plurality of languages). Some current methods of data analysis include the analysis of data during long time frames, and reference to a fixed or slowly changing vocabulary library, which may inhibit the ability of the methods to track the popularity and identify emergence of new terms. In contrast, the method of the present disclosure permits analysis of new terms from subsequent time frames and removal of infrequent terms, which may allow for identification of dynamic changes in vocabulary that are not trends. In particular, the removal of infrequent terms may aid in keeping the method sensitive to terms associated with newly emerging topics.

At steps 410-470, the analysis control system 200 performs a separate analysis of communications during a second time frame, including determination of a second set of frequent terms. In some embodiments, the first and second time frames have fixed lengths that do not overlap. The first and second time frames may be equal in length. In some cases, the first and second time frames are sequential, and either partly overlap or are consecutive with no gap therebetween, while in other cases, the first and second time frames are separated by a third time frame that may not be analyzed. For the purposes of identifying emerging topics, the first and second time frames may be relatively recent in comparison to the determination and display of the set of trending terms. If the first time frame is relatively longer to establish a set of terms, the second time frame may be selected to be relatively shorter or may be cut off more quickly, such as 10%, 25%, ⅓, or 50% of the length of the first time frame, in certain circumstances. For example, in a developing emergency-type trend, it may become clear very quickly into the second time frame that the emergency has not been resolved or is worsening, and an alert can be provided to help direct emergency resources before the entire second time frame has elapsed.

At step 400, the analysis control system 200 compares sets of frequent terms based on the first and second time frames. In some cases, the system 200 compiles a set of terms that appear in both sets of frequent terms. The system 200 may then determine the change in frequency between corresponding terms, preferably based on a statistically significant change in frequency. Terms that are included in the first set of frequent terms but do not appear in the second set of frequent terms may be removed from the analysis. Alternatively, this may indicate a trend itself, or the end of a trend, and may be displayed in a set of trending terms in step 480 according to the disclosure as it may be of great interest to certain users. Typically, however, terms that appear on the second set that do not appear on the first set, or that appear with greater or increasing frequency in the second set compared to the first set, may be included in a set of trending terms in step 480. Terms that appear in both sets of frequent terms may also be included in the set of trending terms. In some cases, an additional frequency threshold is applied during the determination of the set of trending terms at step 480. In this case, terms with a negative change in frequency between the first and second time frames may be excluded from the set of trending terms or as noted above may highlight a trend in itself or the end of a trend and thus be included in the trending terms. A user may select whether to have the system and methods herein evaluate only for increasing trend topics, decreasing trend topics, or both. As in the case of the frequency threshold set in steps 340 and 440, the frequency threshold set during the determination of the set of trending terms may be calculated differently during the same time frame depending on data source.

During or after step 480, the method 300 may include updating various algorithms with the results of the analysis. This may include updating algorithm parameters for the algorithms used in steps 310-340 and 410-440. The algorithms used throughout the method may be updated in various ways. For example, if a very lengthy set of trending terms is formulated at step 480, the algorithm associated with step 340 may be adjusted to set a higher frequency threshold in an effort to remove less popular terms. In one embodiment, feedback from such prior algorithm output facilitates increased accuracy, faster response time to identify new trends or a change in a trend, or both.

At step 490, the analysis control system 200 displays the set of trending terms to a user. In some cases, the set of trending terms is displayed on the display module 190 of FIG. 1 or the display component 292 of FIG. 2. The set may be displayed graphically or in text form. In some cases, additional analysis data is displayed along with the list of trending terms. This additional data may include a total number of terms analyzed, a list of newly identified terms from the first and second time frames, the frequency thresholds used in steps 340, 400, and 440, and the total number of frequent terms from sets determined at steps 370 and 470.

At step 492, the system 200 transmits the set of trending terms to a communication distributor. In some cases, the set of trending terms is transmitted with an analysis of the set of trending terms and/or a recommendation of action. Based on behavioral analytics, the recommendation could be based on a prediction of a likelihood of an action or event occurring, as well. For example, the analysis center 100 may identify terms associated with customer complaints about a product line. The set of trending terms determined by the system 200 may allow the analysis center 100 to identify a trend of complaints about a specific product of the product line, as well as to identify when the complaints emerged and whether they are increasing. This may also be evaluated in connection with the behavioral analytics, such as personality type, of the customers complaining or of agents in a customer service center working with those complaining customers. The set of trending terms is then sent by the analysis center 100 to a communication distributor for distribution as desired, such as to one or more of an employee in a quality control department, to a customer service center supervisor or agent, to a sales team, to an engineering team to begin designing a workaround or future product fix or improvement, etc. The analysis center 100 may also send a recommendation along with the data. The user(s) can then take action to respond to the trend, such as a newly arising problem. In some embodiments, after viewing the set of trending terms, a user can give feedback to the system 200 in an effort to fine-tune the results. For example, if a user does not think that a subset of the set of trending terms is important, he or she can modify the algorithms used to perform the various steps of the method 300 to reject those terms in future analyses.

Figure 4:
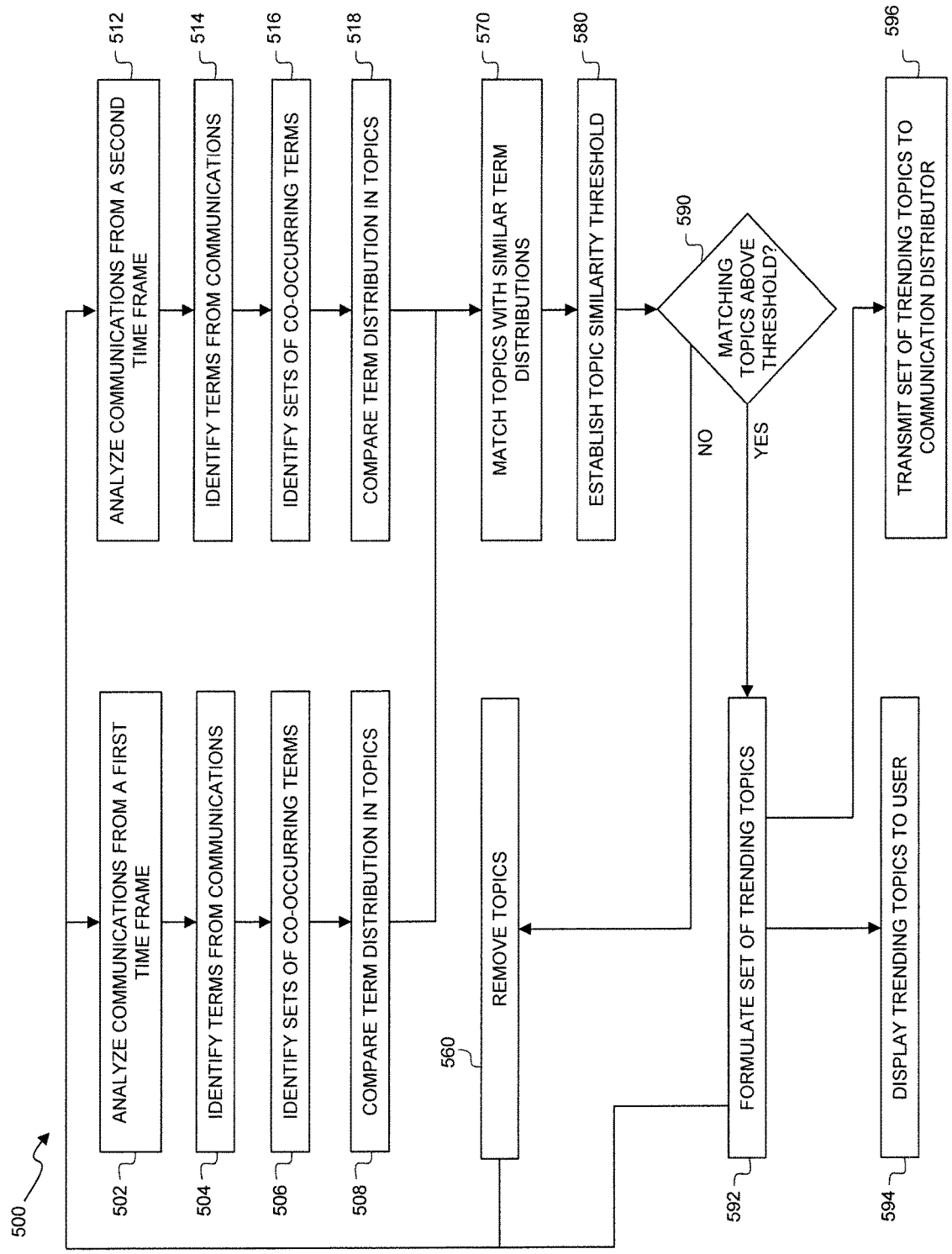
FIG. 4 is a flowchart illustrating a method of determining a set of trending terms according to aspects of the present disclosure.

An exemplary method 500 of analyzing data streams according to the disclosure will now be described with respect to FIG. 4. At step 502, the analysis control system 200 analyzes communications from a first time frame, and at step 504, terms are identified from the communications. The system 200 may conduct this analysis and identification in a similar fashion to the analysis and identification of method 300 (in steps 310 and 320 of FIG. 3).

At step 506, the method 500 may include identifying sets of co-occurring terms. Co-occurrence may be defined as the occurrence of two or more terms alongside each other in a data stream. In the present disclosure, co-occurring terms may be placed together under a single topic, as there may be many different ways to refer to a topic on different communication sources. As used herein, a "topic" is a grouping of one or more terms that represent a single idea, event, or object. In essence, terms may be defined as the building blocks of topics, whose change over time can be tracked by trends. Topics may be identified and defined by groups of terms that share common characteristics. For example, the terms "celebrity", "oscar", and "academy awards" may be grouped together under the topic "Oscars 2016." Additional terms may be added to the topic over time, such as "actor" and "#trophy."

Co-occurring terms may also be grouped together in a "group of co-occurring terms." In some embodiments, limits are placed on the maximum number of terms in a group of co-occurring terms. These limits may be useful in breaking up groups with large numbers of terms that have potentially different meanings. In some embodiments, groups of co-occurring terms include two to four terms, four to eight terms, or eight to twenty terms. Groups of co-occurring terms may also include different types of terms. For example, groups of co-occurring terms can include a number with one or more words or abbreviations. This grouping may be useful in tracking time-related terms, such as "in," "out," and "year," or "oscars 2016." In some cases, groups of co-occurring terms include a number and one to four words or abbreviations. In other cases, two or more numbers can be included with four to ten words or abbreviations. In some embodiments, the identification of groups of terms is accomplished using a Latent Dirichlet Allocation algorithm. Other methods may also be used.

Compound terms may also be included in the term analysis, and can include labels such as hashtags which are commonly used in social media applications such as Twitter. Hashtags are generally used to label topics and identify social media posts associated with these topics. Although hashtags may be single word terms, many hashtags are compound terms which begin with a pound symbol (#). For example, commonly used hashtags include #photooftheday2015 or #TBT or #throwbackthursday. The first term consists of four words (photo, of, the, day) and a number (2015). The second includes three words. Because compound terms may have very different meanings depending on the sub-terms used, method 500 contemplates the subdivision of compound terms, such as hashtags or acronyms, into their constituent terms. For example, method 500 may include the use of Natural Language Processing (NLP) algorithms in steps 502 and 512 that analyze portions of text for possible alternatives such as word order, spacing, or hyphenation. This may allow the analysis control system 200 to account for terms that are used within compound terms. It may also help to solve the problem of long, indecipherable compound terms that may not match terms from other time frames. As in method 300, the terms in method 500 are not compared to a library but only against an earlier selected time frame.

At step 508, the method may include comparing term distribution in topics. The terms organized under each topic may be compared. For example, the topic "Oscars 2016" may include dozens of different terms such as those listed above, which come from many different sources during the same time frame. The popularity of a topic may be assessed in part by the number of terms associated with the topic, as well as the number of sources from which terms are identified.

The method 500 can include performing steps 502, 504, 506, and 508 during a second time frame (represented for example by steps 512, 514, 516, and 518, respectively). The first and second time frames may be fixed, equal, and sequential. In the example of method 500, the analysis control system 200 does not generate the set of terms identified from the communications of the first and second time frame by reference to an existing library of terms, such as pre-defined terms. An independent analysis at each time frame or set of time frames may allow for the recognition of newly emerging terms. It should be understood that a trend can only be identified after an initial second time frame, as the initial first time frame is used to identify keywords that may form a trend. After an initial first and second time frame, the second time frame may be re-purposed as a subsequent first time frame and either the initial first and second time frame or the re-purposed second time frame form the basis against which a later-determined time frame becomes the second time frame and is compared against what is now the considered a first time frame. As such, it should be understood the system and process herein can operate iteratively looking at subsequent time frames.

At step 570, the method 500 may include matching topics with similar term distributions from the first and second time frames. In the present disclosure, groups of co-occurring terms may be found to be equivalent or matched together in order for their occurrences throughout the data streams to be counted. Step 570 may involve comparison of these groups of co-occurring terms and associated topics. In some cases, the criteria for finding that groups of co-occurring terms are equivalent in step 500 is more inclusive than the comparison of terms in step 400 of method 300. In some cases, for groups of co-occurring terms to be considered equivalent, the terms must appear in the same order in all groups. However, in the example of method 500, groups of co-occurring terms may be considered equivalent if corresponding terms appear in the groups in any order, e.g., {2017 oscars} and {oscars 2017}.

Furthermore, some groups of co-occurring terms may be considered equivalent based on a minimum number of common terms. For example, the first group of co-occurring terms {president election candidate 2016} may be considered as equivalent to a second group of co-occurring terms {president US 2016 running}. In this case, two of the terms (president, 2016) have an exact match between the groups, while other terms (candidate, election, US, running) are related. Because emerging topics are often discussed using a variety of different terms that may not all match, the allowance of non-exact matches in this way may allow for a more true understanding of a trend, such as event popularity.

At step 580, the method 500 may include establishing a topic similarity threshold. This threshold can involve quantitative comparisons of terms associated with topics (such as the number of different terms or the number of times in a communication stream that a term has occurred), as well as qualitative comparisons (which may involve weighting terms and topics differently according to their source and usage). In some embodiments, topics that are associated with similar events are compared. For example, the topic "Oscars 2015" from the first time frame may be compared with the topic "Oscars 2016" from the second time frame. The analysis of topics representing similar events can allow "micro-trending" analysis. In particular, the similarities and differences between topics associated with corresponding events (such as "Oscars 2015" and "Oscars 2016") can give insight into the evolution of these events over time. For example, the term "#oscarssowhite" may appear in under the topic "Oscars 2016" while not appearing under "Oscars 2015." The frequency and usage of this newly emerging term may signal a change in the attitudes of viewers, or more generally, users of a service or product. Another example of micro-trend analysis is the identification of the absence of trends. For example, during Super Bowl 50, the system 200 may identify trends associated with the game that appear in every media channel except for one. This may signal that there is a communication disruption or a lack of interest in that media channel. Furthermore, the system 200 may reach out to the media channel (for example, through the use of the routing engine 192 of FIG. 1) to notify it of the finding. At step 590, the method 500 may include determining whether matching topics are above the similarity threshold of step 580. At step 560, topics that are not similar enough to other topics may be removed from the analysis.

At step 592, a set of trending topics may be determined containing the topics that are above the similarity threshold. After determining the set of trending topics, the analysis control system 200 may repeat method 500, beginning again with the analysis of communications from another time frame at step 502. The set of trending terms may be transmitted to a communication distributor in step 596 and displayed to a user in step 594 as discussed above. In some cases, the results of the analysis are used to update algorithms of the system 200 according to desired data. These updates may change the similarity threshold of step 580 or change the identification criteria in steps 504 and 514, for example.

Figure 5:
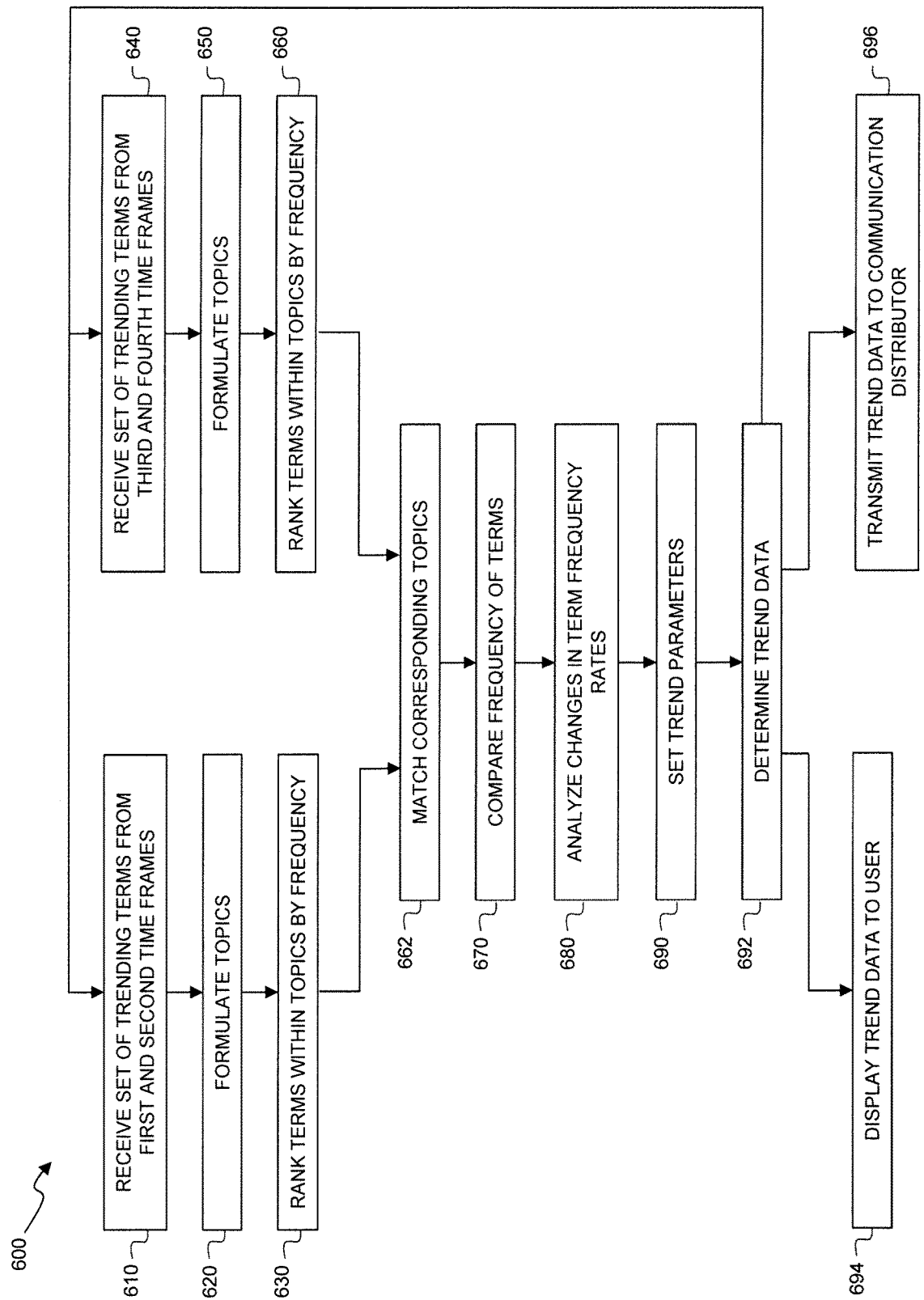
FIG. 5 is a flowchart illustrating a method of determining trend data according to aspects of the present disclosure.

An exemplary method 600 of analyzing data streams according to the disclosure will now be described with respect to FIG. 5. This method may allow for the analysis of trend emergence, prevalence, and duration. At step 610, an analysis control system 200 receives a set of trending terms from a first and second time frame. In some embodiments, the set of trending terms received by the system 200 at this step may be similar to those determined in step 480 of method 300. It should be understood that the unsupervised algorithm may require that various thresholds and parameters are modified to account for various factors, as well, before initiating a further set of time frames. For example, trends involving emergencies, popularity, product design/flaws, new technology, etc., as each somewhat different and may require, e.g., longer or shorter time frames, modification to the selection of co-occurring terms, use of demographic data, use of behavioral data, etc. to best conduct the trend analysis.

At step 620, the method 600 can include formulating topics from the set of trending terms. These topics may be based on topics that were previously identified, such as those identified in steps 508 and 518 of step 500. The analysis of previously-identified topics may allow for analysis of subtle changes in topics over time. Alternatively, the topics are identified at this step based solely on the trending terms identified in the first and second time periods. In any case, the terms may be associated with topics based on the time of their occurrence, similarities in their appearance or spelling, phonetic matching, or based on known events that have occurred (such as the annual appearance of terms relating to the Oscars in the first months of the year).

At step 630, the terms associated with each topic are ranked according to frequency. In some cases, the frequency of groups as a whole is measured, while in other cases, the frequency of individual terms or sub-groupings of terms within each group is measured. Steps 640, 650, and 660 may be identical to steps 610, 620, and 630, with the exception that a set of trending terms from a third and fourth time frame is used.

At step 662, the system 200 may match corresponding topics. This step may involve matching topics from different time periods that relate to a repeating event, such as an annual meeting. In some embodiments, corresponding topics are identified through the occurrence of similar terms. For example, corresponding topics may have associated terms that are similar in spelling, frequency, or time of identification, or phonetic comparison.

At step 670, the analysis control system 200 compares the frequencies of various terms between the first/second and third/fourth time frames. At step 680, the system analyses changes in term frequency rates. The comparison of frequencies between the first/second and third/fourth time frames at this step can be used to calculate changes in frequency rates each term. The change in frequency rate for a particular term can be used to determine whether an associated emerging topic is growing or diminishing in popularity. For example, if the frequency rate of a particular term greatly increased between the first/second and third/fourth frames, it may be associated with a popular emerging topic. Furthermore, the analysis of changes in frequency rates can be used to predict the emergency and popularity of future trends. For example, if an annual event generated a large number of diverse trending terms last year, a similar number of terms may be expected this year. Comparing the expected terms with the predicted terms may be used to determine the accuracy of the predications.

At step 690, the analysis control system 200 sets trend parameters. These trend parameters may be configured to identify the emergence of new trends, discover the overall popularity of trends, track the lifetime of trends, and analyze how trends interrelate. The trend parameters may include the change in frequency rates of different terms as discussed above, as well as an overall frequency of terms, a total number of identified terms relating to a specific trend, and the total amount of time during which terms relating to a trend have been identified. Trend parameters may also include various frequency or similarity thresholds as discussed above. In particular, the trend parameters may be configured to limit the number of trending terms and topics to a specified threshold. This may include discarding less popular or less frequent results and only collecting popular or frequently occurring terms.

At step 692, the analysis center determines data for trends identified using the trend parameters as discussed above. In particular, the data may include a date of first emergence for each trend, trend duration, and overall popularity. This trend data may be based on when terms relating to a trend were recorded for the first time, the frequency of terms related to the trend in recent time periods, and the frequency rate of change for related terms. After determining the duration of a trend, the process of receiving trending terms is repeated, beginning at steps 610 and 640.

At step 694, a selected portion of the trend data is displayed to a user. The selected trend data may be displayed alongside trend parameters used in the generation of trend data, as well as terms associated with each trend. The data may be displayed to a user in various methods, including display on a computer screen in a visual or textual format. At step 696, the trend data is communicated to a communication distributor. This trend data may also be accompanied by further analysis of the trend data as well as recommendation for action.

In view of the present disclosure, it will be appreciated that various methods, apparatuses, computer readable media, and systems have been described according to one or more embodiments for analyzing a customer-agent communication.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems including one or more memories storing various information described herein and one or more processors coupled to the one or more memories and a network, wherein the one or more processors are operable to perform steps as described herein, as non-transitory machine-readable medium including a plurality of machine-readable instructions which, when executed by one or more processors, are adapted to cause the one or more processors to perform a method including steps described herein, and methods performed by one or more devices, such as a hardware processor, user device, server, and other devices described herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to allow a quick determination of the nature of the technical disclosure. It is submitted with the understanding that it will not be used to interpret or limit the scope or meaning of the claims.

What is claimed is:

1. A system for analyzing data relating to trends, which comprises:
    a processor;
    an analysis module, wherein the analysis module is a non-transitory computer readable medium operably connected to the processor, wherein the non-transitory computer readable medium comprises a plurality of instructions stored in association therewith that are accessible to, and executable by, the processor, wherein the plurality of instructions when executed:
        analyze a first plurality of communications occurring over a first time period;
        determine a first plurality of terms based on the analyzed first plurality of communications;
        analyze a second plurality of communications occurring over a second time period;
        determine a second plurality of terms based on the analyzed second plurality of communications;
        identify trending terms based on the determined first plurality of terms and the determined second plurality of terms;
        review the identified trending terms to determine at least one reason for use of the identified trending terms in the first time period, the second time period, or both;
        communicate the identified trending terms and the at least one reason for use of the identified trending terms to a user;
        determine that the identified trending terms are used more frequently in the second time period than in the first time period; and
        direct a routing engine to provide an alert to an agent system;
    a display device configured to display the identified trending terms and the at least one reason for use of the identified trending terms to the user; and
    a routing engine configured to send an automated message to an external source based on the at least one reason for use of the identified trending terms.

2. The system of claim 1, wherein the automated message comprises an advisory or warning.

3. The system of claim 2, wherein the routing engine is further configured to receive a message from the external source regarding a status of the advisory or warning.

4. The system of claim 1, wherein the automated message comprises instructions on how to address the at least one reason for use of the identified trending terms.

5. The system of claim 1, wherein the routing engine is further configured to send an automated message to a plurality of users.

6. The system of claim 5, wherein the routing engine is further configured to select the plurality of users based on the at least one reason for use of the identified trending terms and a geographic location of the plurality of the users.

7. The system of claim 1, wherein the second time period is shorter than the first time period, and the routing engine is directed to provide the alert before the second time period ends.

8. The system of claim 1, which further comprises instructions, that when executed, formulate at least one topic from the identified trending terms.

9. A method of analyzing data related to trends, which comprises:
    recording, by one or more processors, a first plurality of communications occurring over a first time period;
    determining a first plurality of terms based on the first plurality of communications;
    recording, by one or more processors, a second plurality of communications occurring over a second time period;
    determining a second plurality of terms based on the second plurality of communications;
    determining a frequency of the terms in each of the first and second time periods;
    identifying trending terms based on the most frequent terms used in the first and second time periods;
    determining at least one reason for use of the identified trending terms;
    formulating at least one topic from the identified trending terms;
    displaying the identified trending terms, the at least one reason for use of the identified trending terms, and the at least one topic, to a user;
    determining that the identified trending terms are used more frequently in the second time period than in the first time period; and
    directing a routing engine to provide an alert to an agent system.

10. The method of claim 9, wherein the automated message comprises an advisory or warning.

11. The method of 10, further comprising instructing the routing engine to send an automated message to an external source.

12. The method of claim 11, further comprising receiving a message from the external source regarding a status of the advisory or warning.

13. The method of claim 11, wherein the automated message comprises instructions on how to address the at least one reason for use of the identified trending terms.

14. The method of claim 9, further comprising instructing the routing engine to send an automated message to a plurality of users.

15. The method of claim 14, further comprising selecting the plurality of users based on the at least one reason for use of the identified trending terms and a geographic location of the plurality of the users.

16. The method of claim 9, wherein the second time period is shorter than the first time period, and the routing engine is directed to provide the alert before the second time period ends.

17. The method of claim 9, wherein the at least one reason for use of the identified trending terms comprises an emergency.

18. A non-transitory computer readable medium comprising a plurality of instructions stored therein, wherein the plurality of instructions when executed:
    analyze a first plurality of communications occurring over a first time period and determine a first plurality of terms;
    analyze a second plurality of communications occurring over a second time period and determine a second plurality of terms;
    determine a frequency of the terms in each of the first and second time periods;
    compare the frequency of each of the terms in the first and second time periods;
    establish a frequency threshold;
    identify trending terms, wherein the trending terms are terms present in both the first and second time periods that exceed the frequency threshold;
    determine at least one reason for use of the identified trending terms;
    communicate the identified trending terms and the at least one reason for use of the identified trending terms to a user via a display device configured to display the identified trending terms and the at least one reason for use of the identified trending terms;
    instruct a routing engine to send an automated message to an external source;
    determine that the identified trending terms are used more frequently in the second time period than in the first time period; and
    direct the routing engine to provide an alert to an agent system before the second time period ends.

19. The non-transitory computer readable medium of claim 18, wherein the automated message comprises an advisory or warning.

20. The non-transitory computer readable medium of claim 18, wherein the automated message comprises instructions on how to address the at least one reason for use of the identified trending terms.

21. The non-transitory computer readable medium of claim 18, which further comprises, instructions, that when executed, instruct the routing engine to send an automated message to a plurality of users.

22. The non-transitory computer readable medium of claim 21, which further comprises selecting the plurality of users based on the at least one reason for use of the identified trending terms and a geographic location of the plurality of the users.

23. A system for analyzing data relating to trends, which comprises:
    a processor;
    an analysis module, wherein the analysis module is a non-transitory computer readable medium operably connected to the processor, wherein the non-transitory computer readable medium comprises a plurality of instructions stored in association therewith that are accessible to, and executable by, the processor, wherein the plurality of instructions when executed:
    analyze a first plurality of communications occurring over a first time period;
    determine a first plurality of terms based on the analyzed first plurality of communications;
    analyze a second plurality of communications occurring over a second time period, wherein the second time period is shorter than the first time period;
    determine a second plurality of terms based on the analyzed second plurality of communications;
    identify a trending topic based on frequency of terms used in both the first and second time periods;
    determine at least one reason why the identified trending topic is trending;
    communicate the identified trending topic and the at least one reason why the identified trending topic is trending to a user;

a display device configured to display the identified trending topic and the at least one reason why the identified trending topic is trending; and a routing engine configured to receive instructions from the analysis module and send an advisory or warning to an external source before the second time period ends.

24. The system of claim 23, wherein the routing engine is further configured to receive a message from the external source regarding a status of the advisory or warning.

25. The system of claim 23, wherein the advisory or warning comprises instructions on how to address the at least one reason why the trending topic is trending.

26. The system of claim 23, wherein the routing engine is further configured to send an automated message to a plurality of users and select the plurality of users based on the at least one reason why the trending topic is trending and a geographic location of the plurality of the users.

* * * * *